United States Patent [19]
Sakashita

[11] Patent Number: 5,971,437
[45] Date of Patent: Oct. 26, 1999

[54] NON-CONTACT TYPE DATA CARRIER LABEL

[75] Inventor: Hitoshi Sakashita, Misato, Japan

[73] Assignee: Lintec Corporation, Tokyo, Japan

[21] Appl. No.: 08/920,253

[22] Filed: Aug. 28, 1997

[30] Foreign Application Priority Data

Aug. 30, 1996 [JP] Japan .................................. 8-230342
Aug. 28, 1997 [JP] Japan .................................. 9-232630

[51] Int. Cl.⁶ .................................................. B42D 15/00
[52] U.S. Cl. .............................................. 283/81; 283/79
[58] Field of Search ................... 283/79, 80, 81, 283/101, 105

[56] References Cited

U.S. PATENT DOCUMENTS 5,142,270 8/1992 Appalucci et al. ..................... 340/527
5,700,537 12/1997 Instance .................................. 283/101
5,829,789 11/1998 Treleaven et al. ................... 283/101 X

FOREIGN PATENT DOCUMENTS

0 220 056 10/1986 European Pat. Off. .
0 704 816 4/1996 European Pat. Off. .
PCT/EP92/02841 12/1992 WIPO .

*Primary Examiner*—Willmon Fridie, Jr.
*Attorney, Agent, or Firm*—Workman, Nydegger & Seeley

[57] ABSTRACT

A non-contact type data carrier label has a data carrier for storing information and a support member for holding the data carrier, and it is able to attach to a product. The support member has a holding portion for holding the data carrier and paste portion to be pasted on the product in a attachable/detachable manner. A releasable type adhesive layer is formed on the support member. Thus, the data carrier label can be attached to and detached from the product more easily compared with that of conventional one.

20 Claims, 5 Drawing Sheets

FIG. 8

NON-CONTACT TYPE DATA CARRIER LABEL

BACKGROUND OF THE INVENTION

1. Field of the Invention

The present invention relates to a reusable non-contact type data carrier label.

2. Description of the Related Art

For recognizing products in physical distribution systems, visitors to a specific place, or the like, heretofore, automatic recognition or identification technologies such as data carrier, bar code, magnetic stripe, optical character recognition, visual recognition, and voice recognition have been known. Among those technologies, the bar code and the magnetic stripe have been used in general. However, each of them has only a function of bringing an entity corresponding to information, so that the amount of information is comparatively small. In addition, these devices are prepared on the basis of information which is previously decided. It means that only the information without any alterations is expressed as a bar code. If the information is altered after attaching the bar cord on the product, there is the need to change the bar cord label with new one.

In recent years, therefore, attention is being given to the data carrier technology because it is much different from the other types in that the data carrier is not only readable but also writable to add new data without contact.

Hereinafter, one of the examples of how to use the data carrier will be described.

A physical distribution system performs activities of such as transferring, storing, and assorting products (merchandise) and controls the information concerned about these activities. In this case, there is the need for transferring both products and information. Therefore, for example, the data carrier may be used as follows when a plurality of containers is shipped from a distribution center A to a distribution center B.

(1) A main control center sends information to a computer of the distribution center A. The information concerns about work instructions of individual data such as trade name, number, address, and container's number, and so on.

(2) Then, necessary information is written on the data carrier through a writing device, and hence the written information is stored in the data carrier.

Figure 1:
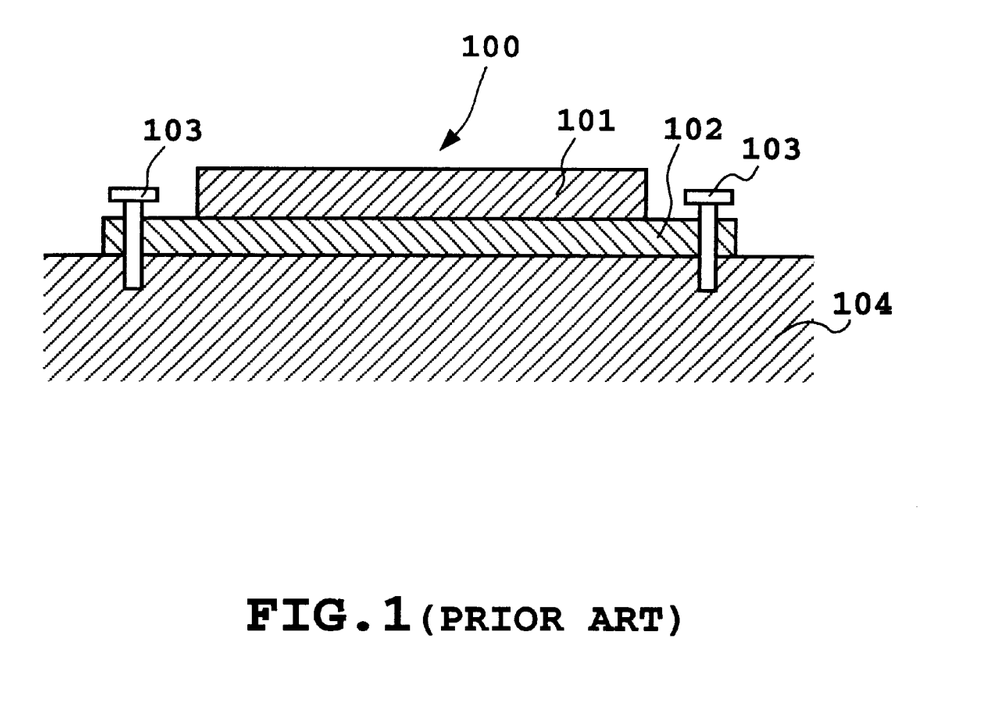
FIG. 1 is a schematic side view of the conventional data carrier label in the type of non-contact.

(3) The written data carrier is attached to the corresponding container. A holding means is required for attaching the data carrier to the container, for example, as shown in FIG. 1, the data carrier 100 is attached on a predetermined position on the container by means of screw. In the figure, the reference numeral 101 denotes a date carrier, 102 denotes a supporting plate, 103 denotes a screw as the holding means, and 104 denotes a container.

(4) A data carrier reading/writing device reads the information stored in the data carrier attached on each container. The containers are assorted and shipped in accordance with the read information that includes their merchandises, shipping addresses, trade names, and the like. Simultaneously, the read information is automatically entered into a computer through the data carrier reading/writing device and then transmitted to a host computer of the main control center through a data communicating system.

(5) When the containers have arrived on a distribution center B, a data carrier reading/writing device reads the information stored in the data carrier attached on each container. Simultaneously, the read information is automatically entered into a computer through the data carrier reading/writing device and then transmitted to a host computer of the main control center through a data communicating system.

Consequently, using the data carrier allows the online physical distribution management in real time with great accuracy.

For detaching the data carrier from the container, an operator has to take off a member that holds the data carrier by using a tool or the like. Generally, the operator must prepare tools for attaching and detaching the data carriers, and have to deal with a lot of containers, so that the process of attaching and detaching the data carriers by using the tool is a time-consuming job and one of the factors interfering the speedy distribution. To solve this disadvantage, there is an idea of imbedding the data carrier in the container. However, it complicates the process of manufacturing the container, causing another problem to be solved.

SUMMARY OF THE INVENTION

Accordingly, an object of the present invention is to provide non-contact type data carrier label which can be easily attached and detached.

There is provided a non-contact type data carrier label to be attached to a product, having a data carrier for storing information and a support member for holding the data carrier, wherein the support member comprises: a holding portion for holding the data carrier; and paste portion to be pasted on the product in a attachable/detachable manner, on which a releasable type adhesive layer is formed.

Here, the holding portion may be provided as one surface of the support member, while the paste portion is provided as other surface of the support member.

The holding portion and the paste portion may be provided on one surface of the support member.

The releasable type adhesive layer may be made of a weak adherent pressure-sensitive adhesive.

The releasable type adhesive layer may be made of a water soluble adhesive.

A state adhesive strength of the releasable type adhesive layer may be 350 g/cm or less.

The data carrier may be selected from types of an electromagnetic induction, electromagnetic coupling, radiomagnetic communication, and micro wave communication.

The releasable type adhesive layer may be made of a water soluble pressure-sensitive adhesive.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiment 1

Figure 2:
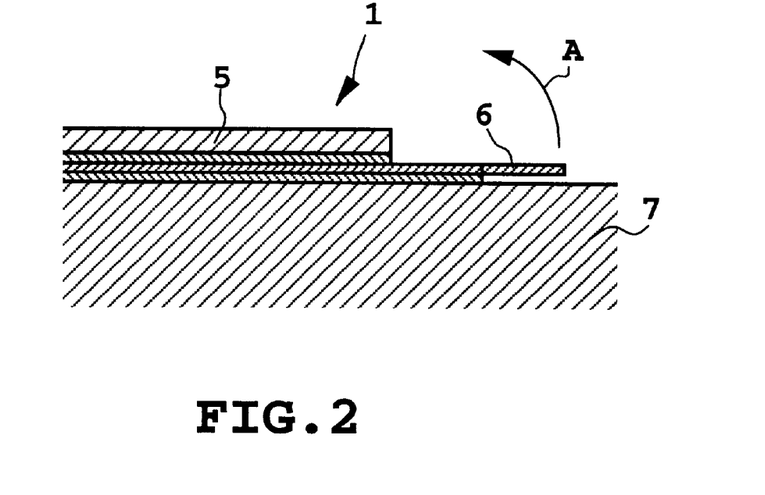
FIG. 2 is a schematic side view of the non-contact type data carrier label as one of the preferred embodiments of the present invention.
Figure 3:
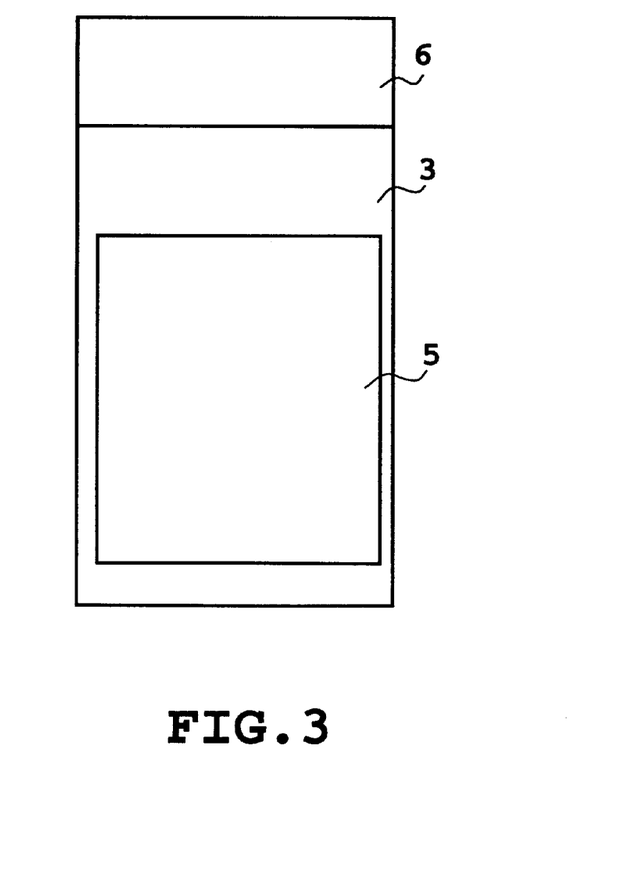
FIG. 3 is a schematic plane view of the non-contact type data carrier label as one of the preferred embodiments of the present invention.

FIG. 2 and FIG. 3 show a non-contact type data carrier label as one of the preferred embodiments of the present invention, where FIG. 2 is a side view and FIG. 3 is a plane view thereof.

As shown in the figures, the non-contact type data carrier label 1 comprises a supporting film 3, a data carrier 5, and a flap 6. The supporting film 3 is provided as a support member having a pasting portion on which an adhesive agent as a releasable type adhesive layer 2 is applied and holding portion on which the data carrier 5 is stacked and fixed through a non-releasable type adhesive layer 4. Furthermore, the flap 6 is arranged on one longitudinal directional end of the supporting film 3.

A raw material of the supporting film may be the one showing the excellent properties of thermal resistance, drug resistance, water resistance, weathering resistance, and so on. For example, the raw material can be selected from polyester resin, polyvinyl chloride resin, polyurethane resin, and the like.

The adhesive agent being applied on the supporting film 3 forms the releasable type adhesive layer that allows the repeated use of the data carrier label. That is, it is easily peeled off from an object 7 (e.g., a container) by pulling the flap 6 in the direction of arrow A. The adhesive layer 2 may be provided as in the form of an adhesive tape. Furthermore, various kinds of adhesives may be used as the releasable type adhesive layer 2. Among them, preferable adhesives for releasable type adhesive layer 2 are a weak adherent pressure-sensitive adhesive and releasable type pressure-sensitive adhesive, which are well known in the art, for example natural rubbers, synthetic rubbers, acrylate resins, polyvinyl ether resins, and silicon resins. Concrete examples of the synthetic resins include: styrene-butadiene rubber, polyisobutylene rubber, isobutylene-isoprene rubber, isoprene rubber, styrene-isoprene block copolymer, styrene-butadiene block copolymer, styrene-ethylene-butylene copolymer, and ethylene-acetate vinyl thermoplastic elastomer. Concrete examples of the acrylate resins include: homopolymer or copolymer of acrylic acid, acrylic methyl, acrylic ethyl, acrylic propyl, acrylic butyl, acrylate-2-ethylhexyl, methacrylic ethyl, methacrylic butyl, and acrylonitrile. Concrete examples of polyvinylether resins include: polyvinylether, and polyvinyl isobutyle ether. Furthermore, concrete examples of the silicon resins include dimethyl polysiloxane. These adhesives may be used solely or used as a combination of at least two adhesives.

In addition, the adhesive strength of the above releasable type adhesive layer is 350 g/cm or less of state adhesive strength defined by JIS-Z1523. If it is over 350 g/cm, the peeling characteristics of the data carrier label 1 will be deteriorated (so-called picking destruction of the surface of the product).

In general, the data carrier 5 is of an electromagnetic induction type, electromagnetic coupling type, radiomagnetic communication type, or micro wave communication type, and comprises a printed circuit substrate that allows a radio data transmission. In the present embodiment, a card type data carrier having a transmission distance of 0.1 to several ten meter (e.g., Miocrostamp™ available from Micron Co., Ltd.) is used. This card is of electromagnetic coupling type and is able to read and write information. In addition, a memory capacity of this card is several ten byte to several kilo byte. If required, over one mega byte memory capacity can be provided.

Embodiment 2

Figure 4:
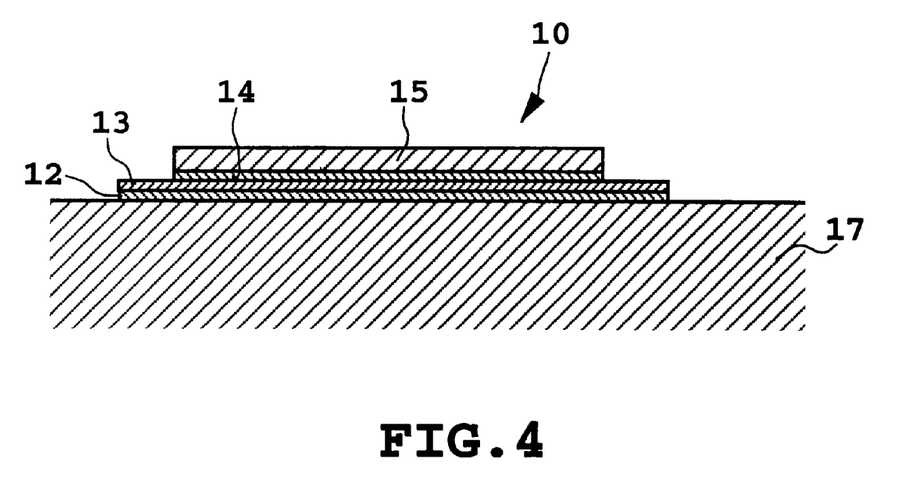
FIG. 4 is a schematic side view of the non-contact type data carrier label as one of the preferred embodiments of the present invention.
Figure 5:
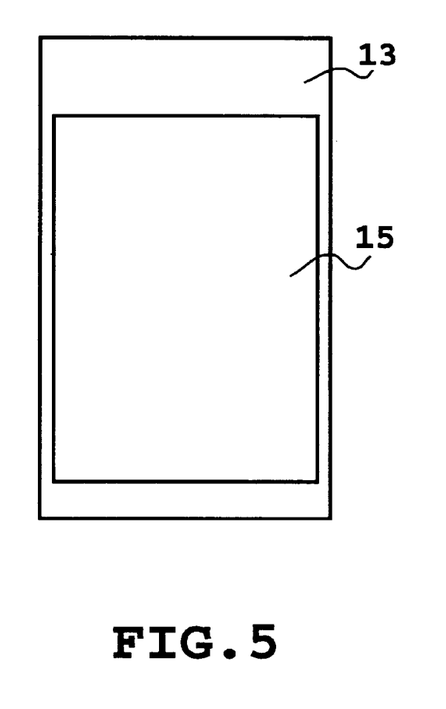
FIG. 5 is a schematic plane view of the non-contact type data carrier label as one of the preferred embodiments of the present invention.

FIG. 4 and FIG. 5 are a non-contact type data carrier as a second embodiment of the present invention, where FIG. 4 is a side view and FIG. 5 is a plane view thereof.

As shown in the figures, the non-contact type data carrier label 10 is configured as the same way as that of Embodiment 1 except the flap. That is, the non-contact type data carrier 10 of the present embodiment comprises a supporting film 13 and a data carrier 15. The supporting film 13 is provided as a support member having a pasting portion on which an adhesive agent as a releasable type adhesive layer 12 is applied and a holding portion on which the data carrier 15 is stacked and fixed through a non-releasable type adhesive layer 14.

The adhesive agent being applied on the supporting film 13 forms the releasable type adhesive layer 12 which is easily able to peel off the data carrier label 10 from the object (e.g., a container) 17. In the first embodiment, the label 1 is peeled off by a force caused by pulling the flap 6. In this embodiment, however, a water-soluble adhesive agent used as the releasable type adhesive layer, so that the data carrier label can be easily peeled off from the object by dipping into water or an alkaline aqueous solution.

The water-soluble adhesive agent used in the present invention is an adhesive to be dissolved or swollen in water or an alkaline aqueous solution. In addition, the above water soluble adhesive agent may be a water-soluble pressure-sensitive adhesive that pastes the data carrier 10 on the object just after peeling its protective sheet (release liner).

The composition of water-soluble pressure-sensitive adhesive which is used in the releasable adhesive layer 12 may be a water-soluble adhesive prepared by adding a surface activating agent which is able to provide plasticity, into a copolymer obtained by a copolymerization between vinyl-based monomers having carboxylic functional group and the other vinyl-based monomers which are able to polymerize with the vinyl-based monomers with carboxylic functional group. In this case, the above surface activating agent may be selected from the group of nonionic surface active agent having ethylene oxide functional group, such as alkylaryl ether typed, for example polyxyethylene nonylphenyl ether, polyoxyethylene octylphenyl ether, and the like, alkylether typed, for example polyoxyethylene lauryl ether, polyoxyethylene oleyl ether and the like, alkylester typed, for example, polyoxyethlene laurylate, polyoxyethylene oleate, sorbitan oleate, and the like, and alkylether phosphate ester, and compound having ethylene oxide/propylene oxide block copolymer such as Pluronic and Tetronic (trade names, available from Asahi Denka Co., Ltd.).

Furthermore, anion-surface active agent having ethyleneoxy functional group may be used.

Embodiment 3

Figure 6:
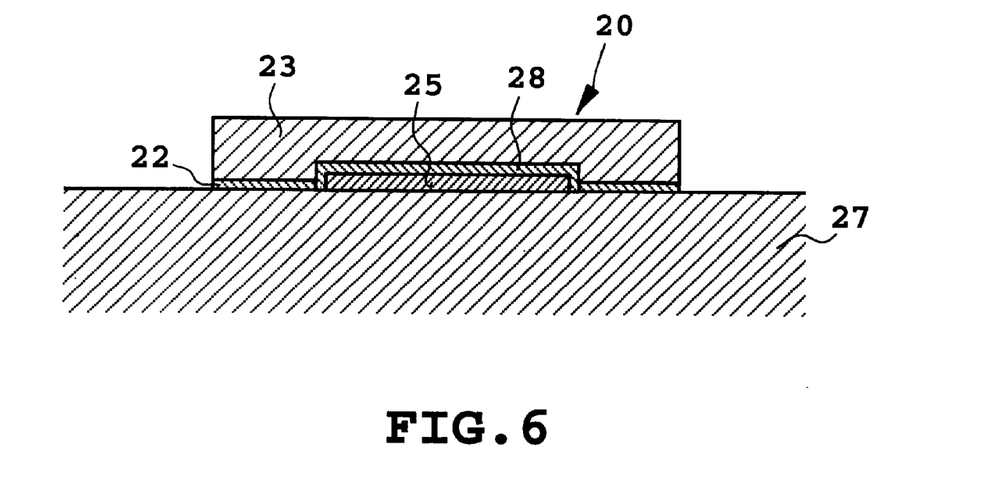
FIG. 6 is a schematic side view of the non-contact type data carrier label as one of the preferred embodiments of the present invention.
Figure 7:
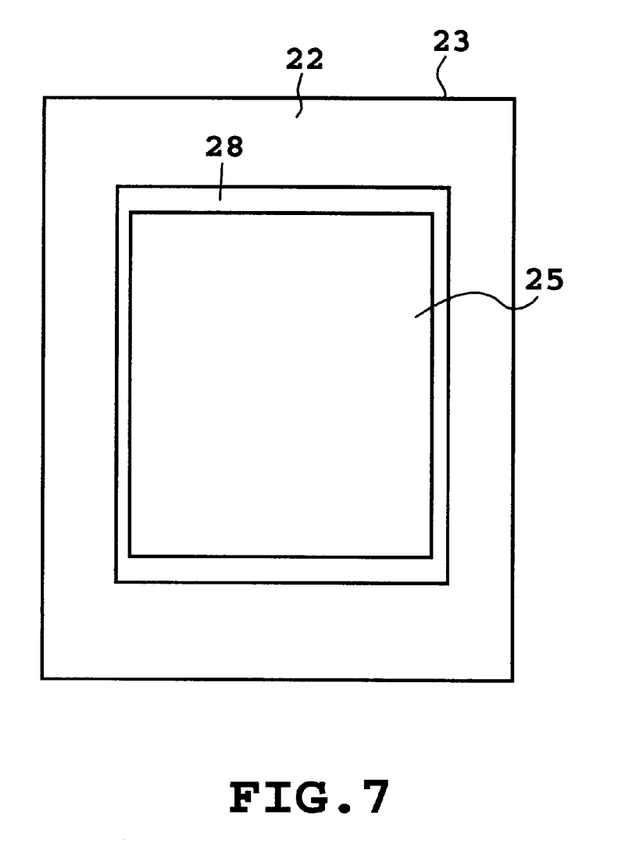
FIG. 7 is a schematic plane view of the non-contact type data carrier label as one of the preferred embodiments of the present invention.

Referring now to FIG. 6 and FIG. 7, a non-contact type data carrier label as another preferred embodiment of the present invention will be described below.

As shown in the figures, the non-contact type data carrier label 20 comprises a supporting film 23 and a data carrier 25.

The supporting film 23 is provided as a support member having a pasting portion on which an adhesive agent as a releasable type adhesive layer 22 is applied and a holding portion on which the data carrier 25 is stacked and held in the gap 28 formed on supporting film 23.

In the first and second embodiments, the data carrier is provided on the support film. In this embodiment, on the other hand, the non-contact type data carrier 20 has a support film 23 which is provided over a data carrier 25. That is, the supporting film 23 is formed in the shape of a comparatively thick rectangular body with a gap 28 formed as a rectangular recess. In this embodiment, furthermore, one of the releasable type adhesives of Embodiments 1 and 2 is applied on an edge 22 around the gap 28. A data carrier 25 is placed in the gap 28 formed as the rectangular recess. Then, an object 27 is covered with the supporting film 23 so as to contact the data carrier 25 with the object 27.

Embodiment 4

In the non-contact type data carrier label of one of the above first to third embodiments, the application of a releasable type adhesive on the supporting film is performed with consideration given to adhesive strength, easiness of peeling, and the like of the adhesive. A method of applying the adhesive on the supporting film may be of uniformly applying the adhesive on a whole surface of the supporting film, applying the adhesive as a plurality of stripes on a surface of the supporting film, applying the adhesive as a plurality of dots on a surface of the supporting film, applying the adhesive as a frame on a surface of the supporting film, or the like.

Figure 8:
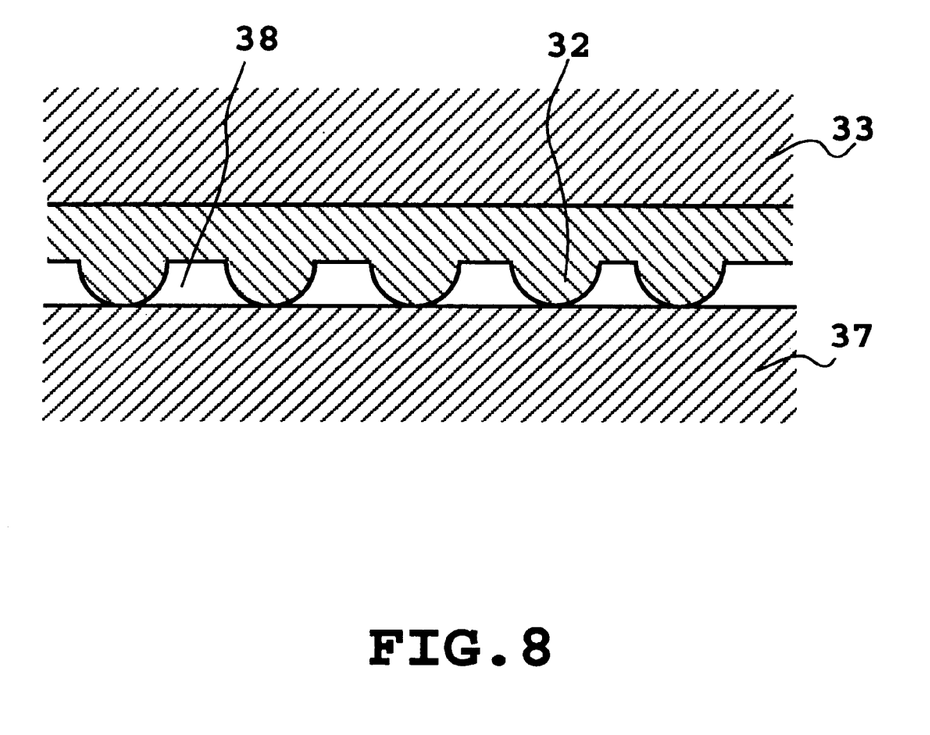
FIG. 8 is a is a schematic side view of a contacted portion between a supporting film of the non-contact type data carrier label and the object.

In this embodiment, the releasable type adhesive layer is a week adherent pressure-sensitive adhesive including fine globular elastomeric polymer particles. As shown in FIG. 8, globular polymer particles 32 are positioned between a supporting film 33 and an object 37, so that a well-spaced gap 38 is formed between the particles to make the peeling more easy. For the polymer of the present embodiment, polyacrylic enter, natural rubber, SBR, polyisoprene, polybutadiene, styrene-butadiene-acrylic ester terpolymer, or the like may be used. In addition, an average particle diameter of the fine globular elastomeric copolymer is preferably in the range of 10 to 100 µm. Additional components except the fine globular elastomeric copolymer may be one or a mixture of at least two compound selected from acrylic ester, polyacrylic acid, SBR, styrene-acrylic ester copolymer, styrene-butadiene-acrylic ester terpolymer, polyvinyl acetate, gelatin, animal glue, casein, and so on.

In addition, the adhesive strength of the above weak adherent pressure-sensitive adhesive layer is 350 g/cm or less of state adhesive strength defined by JIS-Z1523. If it is over 350 g/cm, the peeling characteristics of the data carrier label 1 will be deteriorated.

As described above, therefore, the non-contact type data carrier label of the present invention comprises the support member having the releasable type adhesive layer, so that the data carrier label can be peeled from the object more.easily compared with that of conventional one.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A data carrier label configured for attachment to a structure, the data carrier label comprising:

(a) a support member having a thin-film configuration and including a top surface and an opposing bottom surface;

(b) an electronically readable/writable non-contact type data carrier, the data carrier being secured to the top surface of the support member; and (c) a releasable type adhesive positioned on at least a portion of the bottom surface of the support member so as to facilitate removable attachment of the support member to the structure, the releasable type adhesive being disposed such that the entire support member having the data carrier thereon can be selectively removed from the structure when attached thereto.

2. A data carrier label as recited in claim 1, wherein the support member includes a flap portion extending along at least a portion of an edge of the support member, the flap portion being spaced apart from the releasable type adhesive such that the flap portion is freely exposed above the structure when the support member is attached by the releasable type adhesive to the structure.

3. A data carrier label as recited in claim 1, wherein the data carrier is selected from the group consisting of electromagnetic induction type, electromagnetic coupling type, radiomagnetic communication type, and microwave communication type.

4. A data carrier label as recited in claim 1, wherein the data carrier is secured to the support member by a non-releasing adhesive.

5. A data carrier label as recited in claim 1, wherein the releasable type adhesive comprises a pressure sensitive adhesive.

6. A data carrier label as recited in claim 1, wherein the releasable type adhesive is comprised of a material selected from the group consisting of natural rubbers, synthetic rubbers, acrylate resins, polyvinyl ether resins, and silicon resins.

7. A data carrier label as recited in claim 1, wherein the releasable type adhesive has a state adhesive strength of about 350 g/cm or less.

8. A data carrier label configured for attachment to a structure, the data carrier label comprising:

(a) a support member having a thin-film configuration and including a top surface and an opposing bottom surface;

(b) an electronically readable/writable non-contact type data carrier, the data carrier being secured to the top surface of the support member; and (c) a releasable type adhesive positioned on at least a portion of the bottom surface of the support member so as to facilitate securing the bottom surface of the support member to the structure, the releasable type adhesive being soluble in an aqueous liquid such that the support member having the data carrier secured thereto can be selectively removed and separated from the structure by applying the aqueous liquid to the releasable type adhesive when secured to the structure.

9. A data carrier label as recited in claim 8, wherein the support member is comprised of a material selected from the group consisting of polyester resin, polyvinyl chloride resin, and polyurethane resin.

10. A data carrier label as recited in claim 8, wherein the data carrier is selected from the group consisting of electromagnetic induction type, electromagnetic coupling type, radiomagnetic communication type, and microwave communication type.

11. A data carrier label as recited in claim 8, wherein the data carrier is secured to the support member by a non-releasing adhesive.

12. A data carrier label as recited in claim 8, wherein the releasable type adhesive is water soluble.

13. A data carrier label as recited in claim 8, wherein the releasable type adhesive comprises a water soluble pressure-sensitive adhesive.

14. A data carrier label as recited in claim 8, further comprising a surface activating agent being combined with the releasable type adhesive.

15. A data carrier label configured for attachment to a structure, the data carrier label comprising:

(a) a support member having a top surface and a bottom surface each extending to a perimeter edge, the bottom surface including a recess and a pasting surface extending formed the recess to the perimeter edge;

(b) an electronically readable/writable non-contact type data carrier, the data carrier being disposed within the recess on the bottom surface of the support member; and (c) a releasable type adhesive positioned on at least a portion of the pasting surface of the support member such that the bottom surface of the support member can be removably secured to the structure.

16. A data carrier label as recited in claim 15, wherein the data carrier is selected from the group consisting of electromagnetic induction type, electromagnetic coupling type, radiomagnetic communication type, and microwave communication type.

17. A data carrier label as recited in claim 15, wherein the data carrier is secured to the support member by a non-releasing adhesive.

18. A data carrier label as recited in claim 15, wherein the releasable type adhesive comprises a pressure sensitive adhesive.

19. A data carrier label as recited in claim 15, wherein the releasable type adhesive has a state adhesive strength of about 350 g/cm or less.

20. A data carrier label as recited in claim 15, wherein the releasable type adhesive is water soluble.

* * * * *

UNITED STATES PATENT AND TRADEMARK OFFICE
CERTIFICATE OF CORRECTION

PATENT NO. : 5,971,437
DATED : Oct. 26, 1999
INVENTOR(S) : Hitoshi Sakashita

It is certified that error appears in the above-identified patent and that said Letters Patent are hereby corrected as shown below:

Col. 1, lines 23 and 24, after "bar" change "cord" to --code--

Col. 2, line 22, after "carrier" change "label" to --labels--

Col. 3, line 8, delete the second occurrence of "is a"

Col. 4, line 16, after "configured" change "as" to --in--

Col. 5, line 37, after "polyacrylic" change "enter" to --ester--

Col. 5, line 43, after "two" change "compound" to --compounds--

Col. 5, lines 55 and 56, after "object" change "more.easily" to --more easily--

Col. 5, line 56, after "of" insert --a--

Signed and Sealed this

First Day of May, 2001

Attest:

NICHOLAS P. GODICI

Attesting Officer          Acting Director of the United States Patent and Trademark Office